(12) United States Patent
Rose et al.

(10) Patent No.: US 7,058,827 B2
(45) Date of Patent: Jun. 6, 2006

(54) POWER SAVING CIRCUIT HAS AN INPUT LINE COUPLED TO AN EXTERNAL HOST AND A KEEPER TO HOLD THE LINE IN A WEAKLY HELD STATE

(75) Inventors: Gregory Rose, Roundrock, TX (US); James R. Feddeler, Austin, TX (US); Zahid Ahsanullah, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 542 days.

(21) Appl. No.: 09/910,479

(22) Filed: Jul. 18, 2001

(65) Prior Publication Data

US 2003/0028815 A1 Feb. 6, 2003

(51) Int. Cl.
*G06F 1/32* (2006.01)
*H03K 17/16* (2006.01)
(52) U.S. Cl. .................. 713/320; 713/300; 326/30
(58) Field of Classification Search ................ 713/300, 713/323; 326/83, 87; 327/108, 112, 143
See application file for complete search history.

(56) References Cited

U.S. PATENT DOCUMENTS

| | | | | |
|---|---|---|---|---|
| 4,680,487 A | * | 7/1987 | Kobayashi ................ 326/87 |
| 5,063,308 A | * | 11/1991 | Borkar ..................... 326/26 |
| 5,500,611 A | * | 3/1996 | Popat et al. .............. 326/87 |
| 5,517,650 A | | 5/1996 | Bland et al. |
| 5,539,737 A | | 7/1996 | Lo et al. ................... 370/60 |
| 5,898,686 A | | 4/1999 | Virgile ..................... 370/381 |
| 6,289,409 B1 | * | 9/2001 | Bacigalupo ............... 710/305 |
| 6,335,932 B1 | * | 1/2002 | Kadambi et al. ......... 370/391 |
| 6,356,582 B1 | * | 3/2002 | Mazer et al. ............. 375/219 |
| 6,414,523 B1 | * | 7/2002 | Yoshizaki ................. 327/112 |
| 6,448,812 B1 | * | 9/2002 | Bacigalupo ............... 326/83 |
| 6,625,790 B1 | * | 9/2003 | Casebolt et al. .......... 716/8 |
| 2002/0027448 A1 | | 3/2002 | Bacigalupo |

FOREIGN PATENT DOCUMENTS

| | | |
|---|---|---|
| DE | 199 25 374 | 12/1999 |
| EP | 0 773 648 A1 | 5/1997 |
| WO | WO 00/56024 | 9/2000 |

OTHER PUBLICATIONS

"Input/Output Circuits Programmable in a Suspend Mode", *IBM Technical Disclosure Bulletin*, vol. 37, No. 12, pp. 189-192 (1994).

* cited by examiner

*Primary Examiner*—Chun Cao
(74) *Attorney, Agent, or Firm*—Fish & Richardson P.C.

(57) ABSTRACT

Power saving method is achieved by weakly holding a signal line in its last in time state, which is responsive to and may be overcome by the state of an external signal. During sleep mode, the weakly held signal line state tracks and holds the external signal using alternatively a controllable weak pull-up or pull-down device, such that weakly held state may be driven to a different state by the external driving signal with slight power consumption. When sleep mode is off, the keeper function is disabled and the signal line maybe driven alternatively internally or externally depending upon the state of an enable line.

21 Claims, 1 Drawing Sheet

POWER SAVING CIRCUIT HAS AN INPUT LINE COUPLED TO AN EXTERNAL HOST AND A KEEPER TO HOLD THE LINE IN A WEAKLY HELD STATE

TECHNICAL FIELD

This invention relates to power saving.

BACKGROUND

The Universal Serial Bus (USB) is designed to support asynchronous connection and disconnection between electronic and a USB host. The host is typically a computer. Connection or disconnection may be sensed by a computer or central processing unit (CPU) by monitoring the five volts present on the incoming USB cable shielding.

One method for monitoring the connect state of a USB connection (such as the Intel® SA110 palm device microprocessor) is to connect the USB cable to a general purpose input/output (GPIO) that has a weak pull-down. When the cable state changes (connect to disconnect or vice versa) the GPIO changes state (from low to high on a connect, and vice versa for a disconnect.) This state change can generate an interrupt to a controller and appropriate steps taken. In the case of a disconnect, the interrupt results in the USB input being disabled so as to prevent power burn due to floating inputs.

Many low-power devices connectable to a host have a SLEEP mode whereby power to a CPU or controller in the device is shut off to conserve power while the I/O circuit remains powered up. Under these conditions, the inputs to the USB and some GPIO ports are typically not powered down so that they may remain able to detect a WAKEUP signal or for other purposes. During SLEEP, these inputs can float from state to state while awaiting a WAKEUP signal from a host, thus resulting in power burn. Additionally, the USB cable may be removed or come off during SLEEP, which condition the device should be able to recognize.

A pull-down or a pull-up is provided on the inputs of some devices to prevent float, but to wake the device up through the D+ USB input the external host must pull the D+ line low/high for 100 ms resulting in power consumption in the device while the pull-up/pull-down is being overcome by the external host. For a host fighting an internal square device on an integrated circuit (such as a transistor), the current drain can range from 150 uA to 1 mA.

DETAILED DESCRIPTION

Figure 1:
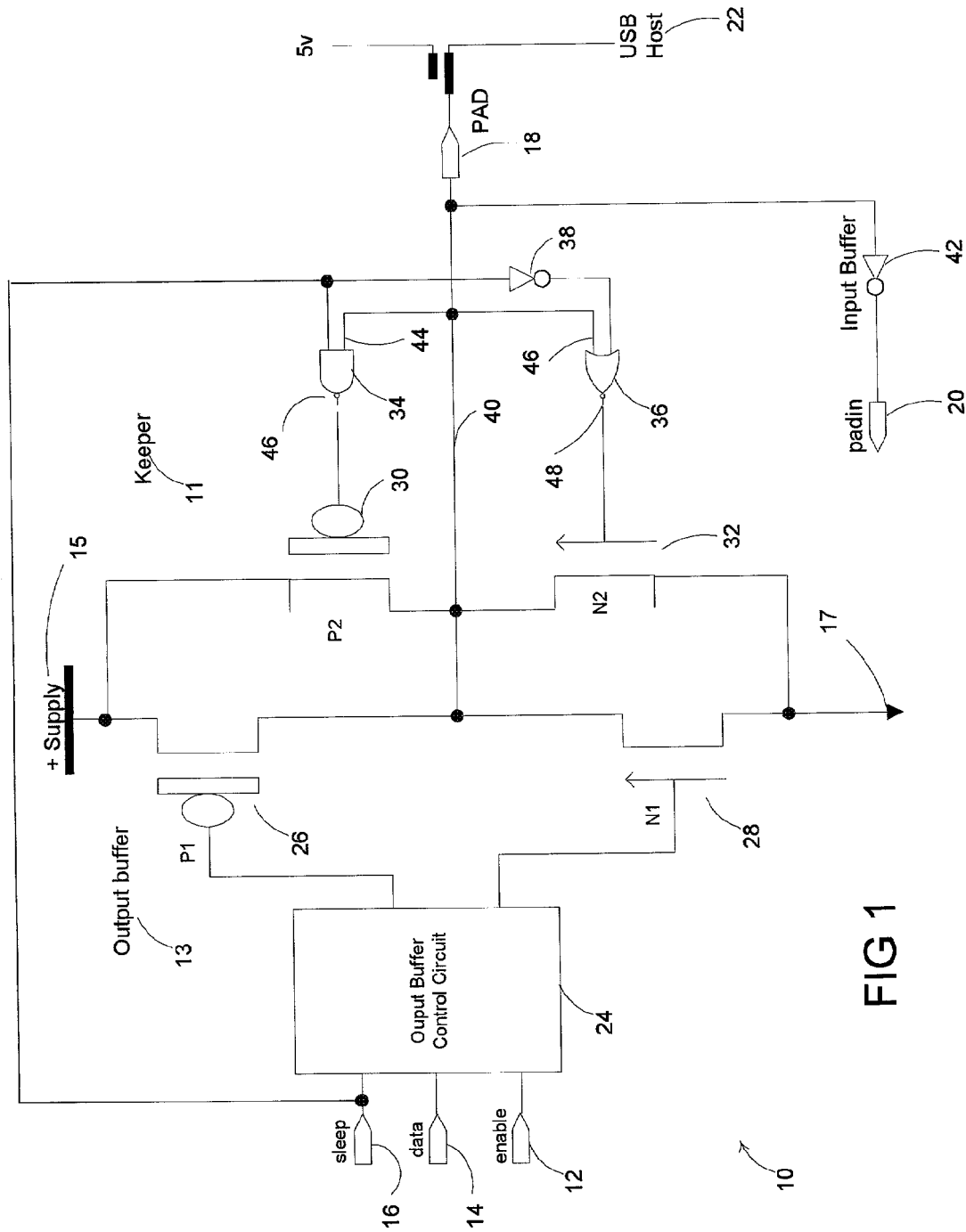
FIG. 1 is a circuit diagram of an exemplary embodiment.

Referring to FIG. 1 an exemplary embodiment of a USB cable disconnect and WAKEUP mode power save circuit 10 is shown as implemented in a microchip.

The circuit 10 has two main sections: a keeper stage 11 and an output buffer stage 13. The circuit 10 is supplied with power from a supply source 15 and ground 17. The circuit has signals ENABLE 12, DATA 14, SLEEP 16, PAD 18, PADIN 20 and USB Host 22. (PAD refers simply to signal line on an integrated circuit chip that is connected to the integrated circuit package via a thin bond wire. In this case, the PAD is connectable to an external USB Host.) The output buffer stage includes buffer control circuit 24 which controls output buffer drivers 26 and 28. Weak pull-up device 30 serves as a controllable weak pull-up, while weak pull-down device 32 serves as a controllable weak pull-down. In an integrated circuit, these may be implemented as square devices (transistors). By "weak" it is meant that the keeper stage 11 supplies only a limited current to hold a particular logic state, which current can be overcome by the USB Host 22 top drive the keeper stage 11 to a different logical state. Typically, this current is in the range of 100 uA to 1.5 mA.

While SLEEP 16 is high, the keeper stage 11 weakly holds the last in time state of PAD 18. Weak means that the keeper stage 11 supplies only a limited current to hold a particular logic state, which current can be overcome by the USB Host 22. Typically, this current is in the range of 100 uA to 1.5 mA. While SLEEP 16 is low, the holding function of keeper stage 11 is disabled.

NAND gate 34 has as one input SLEEP signal 16, and NOR gate 36 has as one input the inverted SLEEP 16, inverted by inverting buffer 38.

Whenever SLEEP 16 is low, the output of NAND gate 34 is high, turning off controllable weak pull-up device 30, and the output of NOR gate 34 is driven low by the inverted SLEEP 16, turning off weak controllable pull-down 32. This effectively disables the holding function of the keeper stage whenever SLEEP 16 is low.

While SLEEP is high, the output of NAND gate 34 depends upon the state of PAD 18: if PAD 18 is high, then the output 46 of NAND gate 34 is low, turning on controllable weak pull-up device 30 (at the same time controllable weak pull-down 32 is turned off) latching and holding PAD 18 high. If PAD 18 is low, then the output 46 of NAND gate 34 is high, turning off controllable weak pull-up device 30 (while at the same time controllable weak pull-down 32 is turned on).

Similarly, while SLEEP 16 is high, inverted SLEEP 16 from inverting buffer 42 is low, thus causing the output 48 of NOR gate 36 to depend on the state of PAD 18. If PAD 18 is high, then the output 48 of NOR gate 36 is low, shutting off controllable weak pull-down 32. When PAD 18 is driven low (for example, by USB Host 22) the output 48 of NOR gate 36 is high, thus turning on controllable weak pull-down 32.

While SLEEP 16 is high, whatever the weakly held state of PAD 18 may be, if PAD 18 is either driven to a different state by USB host 22 or driven during ENABLE high during a time when the local device is controlling the data line, after a brief interval the keeper stage 11 changes to and holds the new (most recent) state of USB host 22 in PAD 18. USB host 22 should be capable of supplying sufficient current to be able to overcome the weakly held state of PAD 18.

When controllable weak pull-up device 30 is on, controllable weak pull-down device 32 device 32 is off, and vice versa. They are both off when SLEEP 16 low, thus disabling the KEEPER 11 stage.

When ENABLE 12 is high and SLEEP 16 is low, PAD 18 is controlled by the output buffer 13 which includes output buffer drivers 26 and 28. When ENABLE 12 and SLEEP 16 are both low (listen mode), PAD 18 may be driven by USB Host 22 and the output buffers 26 and 28 are shut off. Regardless of the state of ENABLE 12, while SLEEP 16 is high, PAD 18 is held weakly at its last in time state. If, while SLEEP 16 high, the USB host 22 drives PAD 18 high (overcoming the weak pull-down if the saved state was low) the local device CPU (not shown) may be awakened.

Using a circuit of this type saves the need to use valuable GPIO circuitry simply for cable detects. Cable detects may be performed by a software timeout condition.

Table 1 shows a logic state chart for the circuit. References to chip refer to the local device CPU (not shown).

TABLE 1

| EN | D | Sleep | PAD | PADIN | USB Host | Comment |
|---|---|---|---|---|---|---|
| 0 | X | 0 | Z | * | Z | Chip listening to USB host and USB host not driving anything |
| 0 | X | 0 | 1 | 0 | 1 | Chip listening to USB host and USB host driving 1 |
| 0 | X | 0 | 0 | 1 | 0 | Chip listening to USB host and USB host driving 0 |
| 1 | 0 | 0 | 0 | 1 | 0 | Chip signaling to USB host via D = 0 and also reading back via PADIN |
| 1 | 1 | 0 | 1 | 0 | 1 | Chip signaling to USB host via D = 1 and also reading back via PADIN |
| X | X | 1 | WX | X | Z | Chip in sleep mode waiting to be woken up via USB host. Host sleeping |
| X | X | 1 | 1 | 0 | 1 | Chip in sleep mode waiting to be woken up via USB host. Host waking up |
| X | X | 1 | 1 | 1 | 0 | Chip in sleep mode waiting to be woken up via USB host. Host waiting |

Legend:
D = Data
EN = Enable
Z => tristated
* => indeterminate
X => either high or low
W => weak signal strength.

WX means weakly driven high or low. While SLEEP 16 is high, when PAD 18=WX it is weakly holding whatever was sent out/in most recently, but this can be overridden by the USB host 22. For example if the USB host 22 drives a 1 when EN=0 and then goes to Z after that, PAD 18 will remain at W1. If the USB host 22 is at Z and EN=1 and the chip drives a 0 through DATA 14 out to PAD 18, that 0 will remain in PAD 18 as W0 after EN=0.

While SLEEP is high, The state of PAD 18 is weakly held and prevented from floating whenever it is not being driven by PAD.

Other embodiments are within the scope of the claims. For example, the circuit could be implemented with discrete electronic devices rather than in a microchip. The controllable weak pull-up device and the controllable weak pull-down device could include a resistive element.

What is claimed is:

1. An apparatus comprising:
    a Universal Serial Bus (USB) device to connect to a USB host, the USB device comprising:
    a PAD signal line connectable to an external signal line that couples to the USB host;
    a keeper stage comprising at least one controllable weak pull-up device and at least one controllable weak pull-down device, the keeper stage to hold the PAD signal line in a weakly held state responsive to changes in a state of the external signal line that occur after a powering down, in which control of the at least one controllable weak pull-up device comprises a logical NAND of a SLEEP signal and a PAD signal on the PAD signal line, and control of the at least one controllable weak pull-down device comprises a logical NOR of an inverted SLEEP signal and the PAD signal.

2. The apparatus of claim 1 in which the weakly held state is the last in time state of the external signal line.

3. The apparatus of claim 1 further comprising circuitry to disable the at least one weak pull-down device if the weak-pull up device is enabled and to disable the at least one weak pull-up device if the weak pull-down device becomes enabled.

4. The apparatus of claim 1 further comprising a controllable output buffer stage which is able to drive the state of the PAD signal and having circuitry to enable and disable the controllable output buffer stage based upon the state of an ENABLE signal.

5. The apparetus of claim 1 in which the SLEEP signal which can enable and disable the keeper stage.

6. The apparatus of claim 1 wherein the keeper stage is implemented in an integrated circuit.

7. The apparatus of claim 1 wherein the controllable weak pull-up device and the controllable weak pull-down device are square devices.

8. The apparatus of claim 1 in which the PAD signal line is also driven by an internal circuit.

9. The apparatus of claim 8 in which the keeper stage also holds the PAD signal line in a weakly held state that represents the last in time state of the PAD signal line as driven by the internal circuit before powering down of the internal circuit.

10. The apparatus of claim 8 in which the weakly held state can be overcome by either the internal circuit or the USB host.

11. The apparatus of claim 1 in which the USB device comprises a processor that, after powering down, awakens when the PAD signal changes state.

12. A method comprising:
    after powering down a Universal Serial Bus (USB) device, sensing a state of an external signal coupled to a USB host;
    storing the state of the external signal in a PAD signal weakly held in a stored state by a keeper stage having at least one controllable weak pull-up device and at least one controllable weak pull-down device, the weakly held PAD signal being responsive to changes in the state of the external signal; and
    controlling the weak pull-up device with a logical NAND of the PAD signal and a SLEEP signal, and controlling the at least one weak pull-down device with a logical NOR of an inverse of the SLEEP signal and the PAD signal.

13. The method of claim 12 in which the weakly held state of the PAD signal may be overcome by the external signal.

14. The method claim 12 further comprising disabling the at least one weak pull-down device when the at least one weak-pull up device is enabled, and disabling the at least one weak pull-up device when the at least one weak pull-up device is enabled.

15. The method of claim 14 further comprising turning on and turning off the at least one weak pull-up and at least one weak pull-down devices based upon the state of the SLEEP signal.

16. The method of claim 15 further comprising implementing the controllable weak pull-up device and the controllable weak pull-down device with square devices in an integrated circuit.

17. The method of claim 12 further comprising enabling and disabling the keeper stage based upon a state of a SLEEP signal.

18. The method of claim 12 further comprising awakening the device when the USB host drives the PAD signal to a different state.

19. A Universal Serial Bus (USB) device having a PAD signal line to connect to a USB host through an external signal line, the USB device comprising:
   an output buffer stage to drive the PAD signal line and the external signal line;
   a keeper stage to maintain a state of the PAD signal line in a weakly held state; and
   a processor;
   wherein the USB device operates in at least three states:
   (a) when both the output buffer stage and the keeper stage are disabled, the USB device listens to the USB host through the external signal line,
   (b) when the output buffer stage is enabled, the USB device drives the external signal line to send a signal to the USB host, and
   (c) when the USB device is powered down, the keeper stage is enabled to hold the PAD signal line in a weakly held state responsive to changes in the external signal line, and the processor is awakened when the USB host drives the external signal line to a different state.

20. The USB device of claim 19 in which the keeper stage comprises at least one controllable weak pull-up device and at least one controllable weak pull-down device.

21. The USB device of claim 20 in which the control of the at least one controllable weak pull-up device comprises a logical NAND of a SLEEP signal and a PAD signal on the PAD signal line, and the control of the at least one controllable weak pull-down device comprises a logical NOR of an inverted SLEEP signal and the PAD signal.

* * * * *